United States Patent [19]
Allen

[11] 3,990,465
[45] Nov. 9, 1976

[54] LUBRICATED VALVE
[75] Inventor: Herbert Allen, Houston, Tex.
[73] Assignee: Cameron Iron Works, Inc., Houston, Tex.
[22] Filed: July 25, 1975
[21] Appl. No.: 599,185

[52] U.S. Cl. .............................. 137/72; 137/246.22; 251/174
[51] Int. Cl.² .......................................... F16K 5/22
[58] Field of Search ...................... 137/246–246.23, 137/72, 74; 251/172, 174

[56]  References Cited
UNITED STATES PATENTS

| | | | |
|---|---|---|---|
| 2,030,458 | 2/1936 | McKellar et al. | 137/246.22 |
| 2,747,600 | 5/1956 | Laurent | 137/246.22 |
| 3,135,285 | 6/1964 | Volpin | 251/172 X |
| 3,157,190 | 11/1964 | Allen | 251/315 X |
| 3,315,697 | 4/1967 | Oliver | 251/172 X |
| 3,346,234 | 10/1967 | Allen | 251/317 X |
| 3,378,026 | 4/1968 | Oliver | 137/246.22 |
| 3,472,270 | 10/1969 | Masheder | 251/174 X |
| 3,695,579 | 10/1972 | Allen | 251/174 |

Primary Examiner—Martin P. Schwadron
Assistant Examiner—Richard Gerard
Attorney, Agent, or Firm—W. F. Hyer; Marvin B. Eickenroht

[57] ABSTRACT

A lubricated valve in which both seal rings which seal between a seat body and a wall of a recess in the flowway through the valve body to form a lubricant chamber between them are preloaded into sealing engagement by means including at least one washer type spring arranged within the lubricant chamber.

8 Claims, 4 Drawing Figures

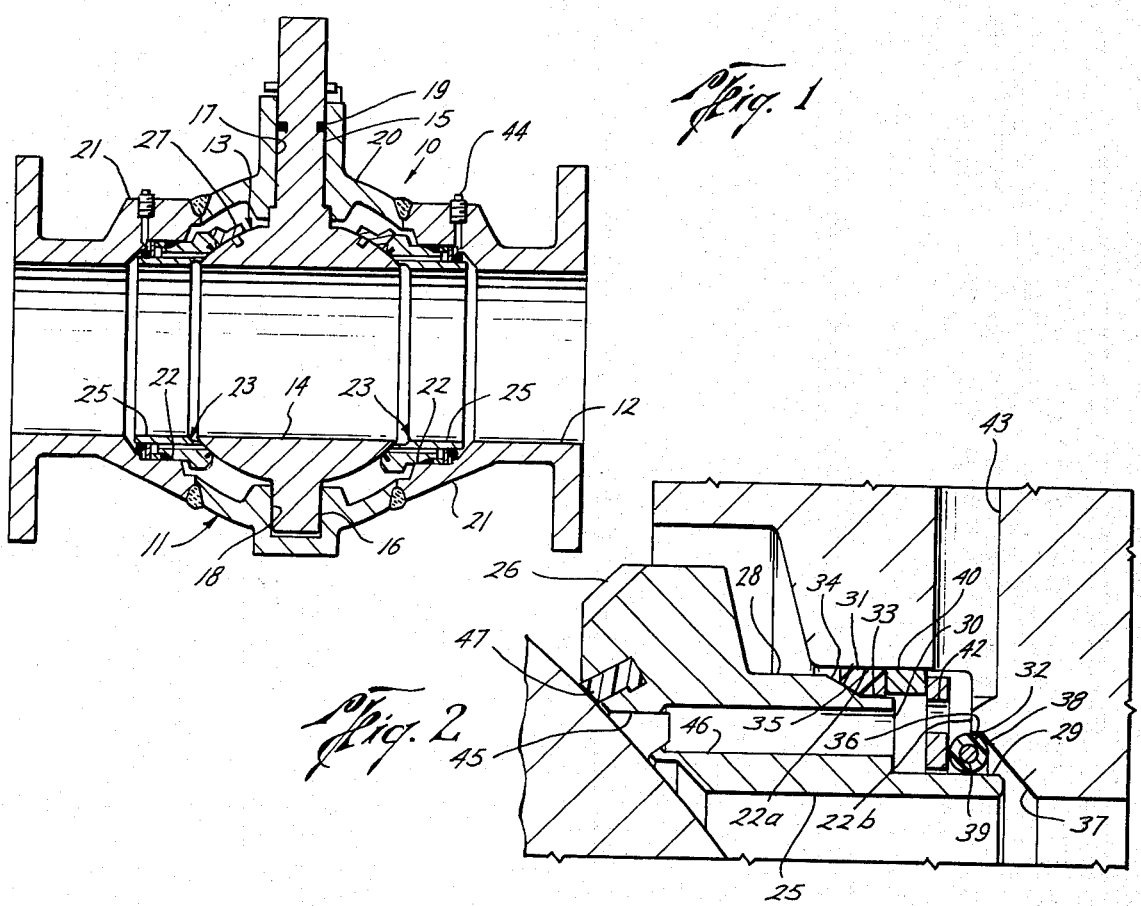
Fig. 1
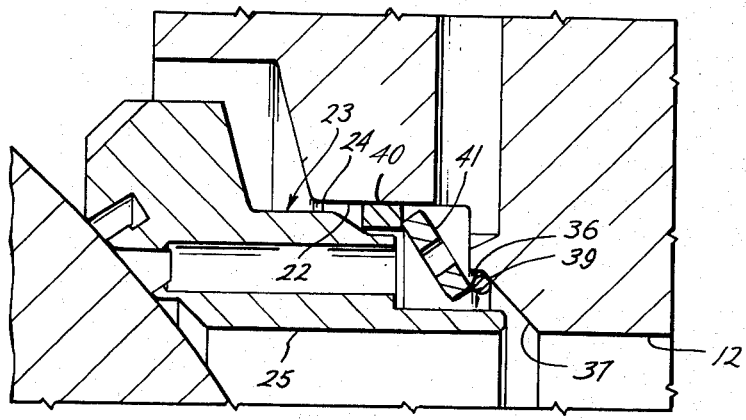
Fig. 2
Fig. 3
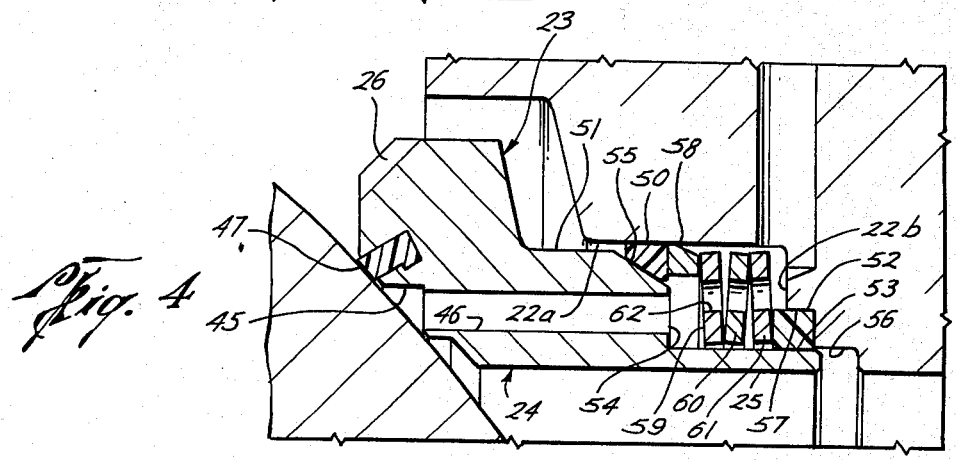
Fig. 4

LUBRICATED VALVE

This invention relates to improvements in valves of the type having one or more lubricated seats.

The surfaces on the inner ends of the seats and the closure member of a valve may become so worn or scored that it is difficult to seal between them. Therefore, valve seats are often lubricated by means of a viscous grease contained within a groove about the inner end of the closure member opposite the groove. In a typical valve of this type, a conventional "grease gun" is attached to a fitting on the valve body which connects with passageways in the valve body and seat body for conducting the lubricant to the groove at a desired pressure. The outer end of the passageway in the seat body and the inner end of the passageway in the valve body connect with a lubricant chamber formed between seal rings sealing between the seat body and a wall of an inner recess of the valve body flowway in which the seat body is received on opposite sides of the connections of the passageways with the chamber.

As shown, for example, in U.S. Pat. No. 3,378,026, these seal rings are pressure energized into sealing engagement with enlarged and reduced diameter portions of the seat body so as to provide an area on the outer end of the seat body over which the lubricant is effective to urge the seat body against the closure member. As also shown in such patent, the inner end of the seat body is initially urged against the closure member by means of a washer type spring acting between the seat body and valve body.

It has been found that such a valve may leak under low pressure conditions, which is thought to be due to the tendency of the moving closure member to pull the seat to one side. This is particularly true if the valve has seats provided with teeth thereabout which are engaged by pawls mounted on the closure member in positions to cause the seats to rotate about their axes, as the closure member moves between opened and closed positions.

As shown in U.S. Pat. No. 3,346,234, it has been proposed to preload a seal ring disposed between a seat body and a wall of the flowway recess by means of a washer type spring acting between the seal ring and the valve body. A seal ring which is preloaded in this manner is less likely to leak under low pressure conditions than is a pressure energized seal. More particularly, the valve shown in this prior patent also has a supplementary "fire seal" in that the preloaded seal ring is backed up by a metal ring which, in the event the primary seal ring is destroyed by heat, is moved by the spring into sealing engagement between the seat body and a wall of the flowway recess.

An object of this invention is to provide a compact arrangement for preloading a seal ring of a lubricated valve of the type described.

Another object is to provide a lubricated valve of the type described having a supplementary fire seal.

These and other objects are accomplished, in accordance with the illustrated embodiments of the invention, by a lubricated valve of the type described wherein both a first seal ring between the enlarged diameter portion of the seat body and a wall of the recess, and a second seal ring between the reduced diameter portion of the seat body and a wall of the recess, are preloaded into sealing engagement therewith by means which includes at least one washer type spring acting between the seal rings and arranged within the lubricant chamber. As in prior lubricated type valves of this type, the seat body has an annular groove in its inner end and a passageway connecting the groove with the lubricant chamber intermediate the first and second seal rings, and the valve body has a passageway connecting its exterior with the lubricant chamber intermediate the first and second seal rings. More particularly, each washer type spring has a bypass in it so as to fluidly connect the lubricant chamber on its outer side with the lubricant chamber on its inner side.

Usually, the first seal ring is of a heat destructible material, a supplementary fire seal in the form of a backup ring is disposed on its outer end, and the washer type spring is arranged to engage the backup ring so as to urge it inwardly against the first seal ring. Thus, upon destruction of the first seal ring, the spring moves the inner end of the backup ring into sealing engagement between the seat body and a wall of the flowway recess.

In one embodiment of the invention, the preloading means comprises a plurality of washer type springs arranged in stacked relation within the lubricant chamber so as to compensate for manufacturing tolerances in the valve. This is especially useful when the first seal ring is backed up by a supplementary fire seal, because in that case, the preloading means, in addition to preloading the first seal, must have sufficient deflection to move the backup ring into sealing engagement between the seat body and a wall of the flowway recess.

In the drawings:

FIG. 1 is a longitudinal sectional view of a lubricated valve constructed in accordance with one embodiment of the present invention;

FIG. 2 is an enlarged longitudinal sectional view of a portion of the valve of FIG. 1, showing the first seal ring prior to its destruction;

FIG. 3 is a view similar to FIG. 2, but upon destruction of the first seal ring and movement of the backup ring into sealing engagement between the seat body and flowway recess; and FIG. 4 is an enlarged longitudinal sectional view of a portion of a valve constructed in accordance with another embodiment of the invention, wherein the first and second seal rings are preloaded by an assembly of three stacked washer type springs.

With reference now to the details of the above-described drawings, the embodiment of the valve shown in FIG. 1, and designated in its entirety by reference character 10, includes a valve body 11 having a flowway 12 therethrough and a closure member 13 movable within the body for opening and closing the flowway. The closure member is ball-shaped and has an opening 14 therethrough which forms a continuation of the flowway 12 in its open position (FIG. 1). The closure is rotatably mounted in the valve body by means of stems 15 and 16 thereon received within bearings 17 and 18, respectively, in the upper and lower sides of valve body 11. Stem 15 extends through its bearing 17 to provide an outer end by which rotation may be applied to the ball closure, and a seal ring 19 surrounds stem 15 within the bearing.

The valve body 11 includes a central part 20 in which the bearings 17 and 18 are provided, and tubular end portions 21 welded to opposite open sides of the central portion 20 to form portions of flowway 12 on opposite sides of the ball closure. Flanges on the ends of the tubular end portions provide means for connecting the valve in a flowline.

The flowway portion through each of the tubular end portions has a recess 22 to receive a seat 23 having a body 24 which carries seal rings for sealing between a wall of the recess and the adjacent side of the ball closure, as will be described below. More particularly, seat body 24 has an inner diameter 25 forming a continuation of the flowway 12, as well as the opening 14 in the ball closure, in the open position of the closure.

As described in U.S. Pat. No. 3,157,190, central part 20 of the valve body 11 may be split along a line passing through the axis of flowway 12 and perpendicular to stems 15 and 16, so as to permit the split halves to be assembled over the stems and welded to one another to capture the ball closure. The seats may then be disposed within their respective flowway recesses in the tubular end portions, and such portions then welded to the open sides of the central part 20 to complete assembly of the valve.

Each seat body 24 is caused to rotate about its axis automatically in response to movement of the ball closure between opened and closed positions. Thus, as fully described in the aforementioned U.S. Pat. No. 3,157,190, the inner end of each seat body is provided with teeth 26 thereabout in position to be engaged by a dog 27 carried on the top side of the ball closure so as to rotate the seat from one rotative position to another as the ball closure moves into its open position. Thus, upon movement of the ball closure back to closed position (FIGS. 2 and 3), the dog 27 is caused to disengage from the seat and assume a position from which it may again be moved into engagement with the seat upon return of the ball closure to its open position.

Each flowway recess includes a cylindrical wall 22a and an end wall 22b which faces the closure, and each seat body 24 is provided with an enlarged diameter portion 28 received within cylindrical wall 22a and a reduced diameter portion 29 which extends outwardly to a position close to end wall 22b. The enlarged and reduced diameter portions are connected by an end wall 30 on the seat body which is spaced from and faces outwardly toward the inwardly facing end wall of the recess 22 to provide an annular space between the seat body and flowway recess.

A seal ring 31 is sealably engaged between enlarged portion 28 of each seat body and wall 22a of the flowway recess in which it's received, and a seal ring 32 is sealably engaged between reduced portion 29 of the seat body and the adjacent end wall of the recess. When so sealingly engaged, the seal rings define a lubricant chamber within the annular space between the oppositely facing walls of the seat body and flowway recess.

The enlarged diameter portion 28 of each seat body has a reduced diameter surface 33 at its outer end which is concentric with recess wall 22a to form an annular space therebetween in which seal ring 31 is received. A conical shoulder 34 flares radially outwardly from the inner end of surface 33 toward the closure at the inner end of the annular space, and seal ring 31 has a shoulder 35 on its inner end conforming to the shoulder 34. The seal ring which is formed of any suitable sealing material, preferably Teflon, is "heat destructible" in the sense that it will be destroyed at temperatures which would not destroy the metal parts of the seat body and valve body.

End wall 22b of each recess includes a cylindrical surface 36 which is arranged concentrically of the reduced diameter portion 29 of the seat body to form an annular space between them in which seal ring 32 is received. A conical shoulder 37 flares outwardly from its intersection with flowway 12 formed in the tubular end portion of the valve body to the outer end of surface 36. Seal ring 32 is circular in cross section for fitting against shoulder 37, and comprises a hollow sleeve 38 of sealing material, preferably Teflon, through which a metal wire 39 extends.

The fire seal between the enlarged portion 29 of the seat body and wall 22a of the flowway recess includes a metal backup ring 40 disposed on the outer end of seal ring 31. In the event seal ring 31 is destroyed, the backup ring 40 is free to move inwardly toward the closure so as to sealably engage between the seat body and wall 22a of the flowway recess. More particularly, as the inner edge of the inner diameter of the backup ring 40 is forced against shoulder 34 on the seat body, its outer wall is urged tightly against wall 22a.

In accordance with the FIGS. 1 to 3 embodiment of the present invention, each of the seal rings 31 and 32 and backup ring 40 are preloaded by means of a washer type spring 41 arranged within the lubricant chamber so that, when unstressed, its conical shape converges away from the closure. Thus, the outer diameter portion of spring 41 engages the outer end of backup ring 40, and the inner diameter portion thereof engages seal ring 32. More particularly, the seat body, seal rings and backup ring are of such longitudinal extent relative to the recess that when the valve is assembled with the inner end of the seat body bearing against the closure, as shown in FIG. 2, the spring 41 will be flexed toward a flattened position, as shown in FIG. 2. Thus, its outer diameter portion preloads backup ring 40 and thus seal ring 31 into sealing engagement between the enlarged portion of the seat body and wall 22a of the flowway recess, and its inner diameter portion preloads seal ring 32 into sealing engagement between the reduced portion of the seat body and end wall 22b of the flowway recess. At the same time, the inwardly directed force of the spring is transmitted through seal ring 31 and backup ring 40 to the outwardly facing shoulder 34 of the seat body, and the outwardly directed force of the spring is directed through seal ring 32 to the inwardly facing shoulder 37 on the valve body, so as to urge the seat body against the closure.

Upon destruction of seal ring 31, the inwardly directed force of spring 41 will cause the backup ring 40 to move inwardly into the annular space between the valve body and flowway recess and thus against the shoulder 34 for sealing between the seat body and wall 22a of the recess, as previously described. Although the spring 41 has moved toward its unstressed position, it is still flexed in its FIG. 3 position so as to provide the necessary force for continuing to force seal ring 32 and backup ring 40 into sealing position.

Spring 41 has a series of by-pass openings 42 therein which connect the lubricant chamber on its outer side with the lubricant chamber on its inner side. Lubricant is introduced into the chamber on the outer side of spring 41 through a passageway 43 which connects the exterior of the valve body with the chamber intermediate the seal rings 31 and 32. Lubricant is introduced into the passageway 43 through a grease fitting 44 mounted in its outer end, as shown in FIG. 1, in position to receive a conventional grease gun.

Upon passing from passageway 43 through by-pass openings 42 in the spring, the lubricant is conducted into a groove 45 about the inner end of the seat body through passageways 46 extending lengthwise of the seat body and connecting at their outer ends with the lubricant chamber intermediate seal rings 31 and 32 on the inner side of spring 41. A dam for the lubricant is provided on the downstream side of groove 45 by means of seal ring 47 mounted on the inner end of the seat body. Similarly to the seal rings 31 and 32, the ring 47 may be made of Teflon, so that, as shown in FIG. 3, it too is destructible to permit the inner end of the seat to move into tight engagement with the ball closure.

Although a fire seal may also be provided for replacing seal ring 32 in the event it is destroyed by fire, it is not as essential as the fire seal for replacing seal ring 31. Thus, upon destruction of the latter, backup ring 40 will seal between the seal body and a wall of the flowway recess along a diameter which is larger than that over which line pressure is effective, so that line pressure will not produce a force tending to move the seat body away from the closure. This, of course, would not be the case in the event a fire seal were to be provided only for replacing seal ring 32.

The valve constructed in accordance with the second embodiment of the invention may be identical to that of the first embodiment except for certain of those parts illustrated in FIG. 4, including the seal rings which seal between the seat body and a wall of flowway recess, and the means including a washer type spring which acts between them for preloading the seal rings. In fact, parts of the valve body and seat body shown in FIG. 4 may be identical to corresponding parts of the valve illustrated in FIGS. 1 to 3 and thus bear corresponding reference characters.

As in the case of the first embodiment, a seal ring 50 seals between an enlarged diameter portion 51 of seat body 25 and a cylindrical wall 22a of the flowway recess in which the seat body is received, and a seal ring 52 seals between a reduced outer diameter portion 53 of the seat body and an end wall 22b of the recess. As in the case of the first embodiment, the enlarged and reduced diameter portions 51 and 53 of the seat body are connected by an end wall 54 which is spaced from and faces end wall 22b of the recess to provide an annular space between the seat body and flowway recess.

An outwardly convergent conical shoulder 55 is formed on the outer end of enlarged diameter portion 51 of the seat body to provide an annular space between it and wall 22a. The seal ring 50, which may be made of Teflon, has a cross section conforming to that of the space, so that, similarly to the seal ring 31, it fits tightly within the space to seal between the seat body and a wall of the flowway recess.

End wall 22b is provided with a first counterbored portion 56 aligned with the reduced diameter portion 53 of the seat body so as to receive such portion upon outward movement of the seat body from the position shown in FIG. 4, and a second counterbored portion 57 which has a cylindrical surface which faces oppositely to the reduced diameter portion 53 of the seat body to form an annular space therebetween in which seal ring 52 is closely received. This latter seal ring is, as was true of the exterior portion of the seal ring 32, made of Teflon. As in the case of the FIGS. 1 to 3 of the embodiment, seal rings 50 and 52 form a lubricant chamber between them which includes the aforementioned annular space between the seat body and flowway recess.

A metal backup ring 58 is disposed on the outer end of seal ring 50, so that, similarly to backup ring 40, it is free to move into the annular space between shoulder 55 and wall 22a upon destruction of the seal ring 50. As the ring is urged into the space, and the corner of its inner diameter engages shoulder 55, its outer diameter is urged outwardly against wall 22a to form a tight seal therewith.

Backup ring 58 as well as the seal rings 50 and 52 are preloaded by a plurality of washer type springs 59, 60 and 61 arranged in stacked relation within the lubricant chamber — i.e., with the unstressed conical shaped of adjacent springs opposed to one another. Thus, the inner diameters of springs 59 and 60 and the outer diameters of springs 60 and 61 are engaged with one another, so that the outer diameter of the lefthand spring 59 and the inner diameter of the righthand spring 61 bear against backup ring 58 and seal ring 52, respectively. Hence, as in the case of the single washer type spring 51 shown in FIGS. 1 to 3, the assembly of springs 59, 60 and 61 provides a means which, in preloading seal rings 50 and 52 as well as backup ring 58, also provides a force which urges the inner end of the seat body against the closure.

That is, as described in the case of the previous embodiment, with the seat disposed in the position of FIG. 4, each of the washer type springs is flexed from its unstressed conical position to a more flattened shape. More particularly, this flexure is of such extent that the assembly of washer type springs will not only preload seal rings 50 and 52 under normal conditions, but will also cause the backup ring 58 to be moved into the space between the seat body and flowway portion 22a, upon destruction of the seal ring 50, and then hold the backup ring 58 and seal ring 52 with a sufficient force to maintain its seal between the seat body and valve body. Also, and again as in the case of the single spring 62, each of springs 59, 60 and 61 is provided with a by-pass opening 62 through it for connecting the lubricant chamber on its outer side with the lubricant chamber on its inner side, these openings preferably being aligned with one another so as to provide the least resistance to flow of a lubricant in by-passing the springs.

Lubricant is introduced into the lubricant chamber through a fitting in the valve body, such as shown in FIG. 1, into the passageway 43 which connects with the lubricant passageway intermediate the seal rings 50 and 52 and on the outer side of the assembly. Lubricant is then conducted to groove 45 about the inner end of the seat body through seat body passageways 46 connecting at their outer ends with the lubricant chamber intermediate seal rings 50 and 52 and on the inner side of the assembly.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the present invention without departing from the scope thereof, it is to be understood that all matter herein set forth or shown in the accompanying drawings is to be interpreted as illustrative and not in a limiting sense.

The invention having been described, what is claimed is:

1. A valve, comprising a body having a flowway therethrough, a closure member movable within the body for opening and closing the flowway, said flowway having an inner recess on one side of the closure member, an annular seat within the flowway recess, said seat comprising an annular body having enlarged and reduced outer diameter portions, a first seal ring between said enlarged diameter portion and a wall of the recess, a second seal ring between said reduced diameter portion and a wall of the recess, so as to define a lubricant chamber between the recess and the seat body intermediate the first and second seal rings, and means including at least one washer type spring arranged within the lubricant chamber and acting between the first and second seal rings for preloading the first seal ring into sealing engagement with said enlarged diameter portion and wall of the recess, and the second seal ring into sealing engagement with said reduced diameter portion and wall of the recess, said seat body having an annular groove in its inner end and a passageway connecting the groove with the lubricant chamber intermediate the first and second seal rings, said valve body having a passageway connecting its exterior with the lubricant chamber intermediate the first and second seal rings, and each said spring having a bypass therein fluidly connecting the lubricant chamber on its outer side with the lubricant chamber on its inner side.

2. A valve of the character defined in claim 1, wherein the first seal ring is made of a heat destructible material, and a backup ring is disposed between the outer end of the first seal ring and the spring, so that, in the event of destruction of said first seal ring, the inner end of said backup ring will be moved by the spring into sealing engagement between said enlarged diameter portion of the seat body and the wall of the flowway recess.

3. A valve of the character defined in claim 1, wherein said preloading means includes a plurality of stacked washer type springs acting between said first and second seal rings.

4. A valve, comprising a body having a flowway therethrough, a closure member movable within the body for opening and closing the flowway, said flowway having an inner recess on one side of the closure member, an annular seat within the flowway recess, said seat comprising an annular body having enlarged and reduced diameter portions, the enlarged diameter portion of the seat body and a wall of the recess forming a first annular space between them, and the reduced diameter portion of the seat body and the wall of the recess forming a second annular space between them, said enlarged diameter portion having a first outwardly facing shoulder at the inner end of the first space, and said flowway recess having a second inwardly facing shoulder at the outer end of the second space, a first seal ring within the first annular space, a second seal ring within the second annular space, so as to define a lubricant chamber between the wall of the recess and the seat body intermediate the first and second seal rings, and means including at least one washer type spring arranged within the lubricant chamber and acting between the first and second seal rings for preloading the first seal ring against the first shoulder and into sealing engagement with said enlarged diameter portion and the wall of the recess, and the second seal ring against the second shoulder and into sealing engagement with said reduced diameter portion and the wall of the recess, said seat body having an annular groove in its inner end and a passageway connecting the groove with the lubricant chamber intermediate the first and second seal rings, said valve body having a passageway connecting its exterior with the lubricant chamber intermediate the first and second seal rings, and each said spring having a bypass therein fluidly connecting the lubricant chamber on its outer side with the lubricant chamber on its inner side.

5. A valve of the character defined in claim 4, wherein the first seal ring is made of a heat destructible material, and a backup ring is disposed between the outer end of the first seal ring and the spring, so that, in the event of destruction of said first seal ring, the inner end of said backup ring will be moved by the spring against the shoulder and into sealing engagement between said enlarged diameter portion of the seat body and the wall of the flowway recess.

6. A valve of the character defined in claim 4, wherein said preloading means includes a plurality of stacked washer type springs acting between said first and second seal rings.

7. A valve, comprising a body having a flowway therethrough, a closure member movable within the body for opening and closing the flowway, said flowway having an inner recess on one side of the closure member, an annular seat within the flowway recess, said seat comprising an annular body having enlarged and reduced diameter portions, said enlarged diameter portion of the seat body having an outwardly facing shoulder thereabout, a first seal ring of heat destructible material between the enlarged diameter portion of the seat body and a wall of the flowway recess, a second seal ring between the reduced diameter portion of the seat body and the wall of the flowway recess, so as to define a lubricant chamber between the valve body and the seat body intermediate the first and second seal rings, a backup ring on the outer end of the first seal ring, and means including at least one washer type spring arranged within the lubricant chamber and acting between the valve body and the backup ring for preloading the backup ring against the first seal ring and thus the first seal ring against the shoulder for sealing between said enlarged diameter portion and the wall of the flowway recess, said backup ring being movable by the washer type spring against the shoulder and into sealing engagement between said enlarged diameter portion of the seat body and the wall of the flowway recess in the event of destruction of said first seal ring, said seat body having an annular groove in its inner end and a passageway connecting the groove with the lubricant chamber intermediate the first and second seal rings, and said spring having a bypass therein fluidly connecting the lubricant chamber on its outer side with the lubricant chamber on its inner side.

8. A valve of the character defined in claim 7, wherein the preloading means includes a plurality of washer type springs arranged in stacked relation.

* * * * *